United States Patent [19]

Brun

[11] Patent Number: 4,631,642
[45] Date of Patent: Dec. 23, 1986

[54] ADAPTOR FOR COUPLING A LIGHT GUIDE TO A LIGHT SOURCE, IN PARTICULAR FOR PROVIDING AN INTEGRATED SIDE LIGHT IN A MOTOR VEHICLE HEADLAMP ASSEMBLY

[75] Inventor: Norbert Brun, Bobigny, France
[73] Assignee: Cibie Projecteurs, France
[21] Appl. No.: 736,460
[22] Filed: May 21, 1985
[30] Foreign Application Priority Data May 25, 1984 [FR] France ................... 84 08241

[51] Int. Cl.$^4$ .................................... F21V 7/04
[52] U.S. Cl. ............................ 362/32; 362/61; 362/83
[58] Field of Search .............. 362/32, 61, 80, 83; 350/96

[56] References Cited

U.S. PATENT DOCUMENTS

| 2,808,502 | 10/1957 | Large | 362/32 |
| 3,360,640 | 12/1967 | Seitz et al. | 362/32 X |
| 3,437,804 | 4/1969 | Schaefer et al. | 362/32 |
| 4,151,582 | 4/1979 | Grunberger | 362/32 X |

FOREIGN PATENT DOCUMENTS

| 153107 | 9/1950 | Australia | 362/32 |
| 1025462 | 4/1953 | France | 362/32 |
| 45986 | 4/1979 | Japan | 362/83 |

Primary Examiner—Tony M. Argenbright
Attorney, Agent, or Firm—McCormick, Paulding & Huber

[57] ABSTRACT

An adaptor in accordance with the invention serves to couple a cylindrical light guide (40) with a light source (10). The adaptor comprises an inlet surface (20) which is concave, which is spherical, which is centered on the center point (0) of said light source and which receives said light source in such a manner that all light rays from said source striking said inlet surface pass therethrough without being deflected and thus enter the guide; the adaptor further includes a light flux recovery surface (30) which is convex and symmetrical about the axis of the light guide, said recovery surface is such that the angle of incidence of a light ray emitted from the source and passing into the guide through the inlet surface is always greater than the limiting angle for total internal reflection corresponding to the refractive index of the material constituting the guide. In this manner, any ray which enters the light guide and which strikes the recovery surface is totally internally reflected and is consequently captured by the light guide. The invention is particularly applicable to providing integrated side lights in a compact headlamp assembly for a motor vehicle.

9 Claims, 4 Drawing Figures

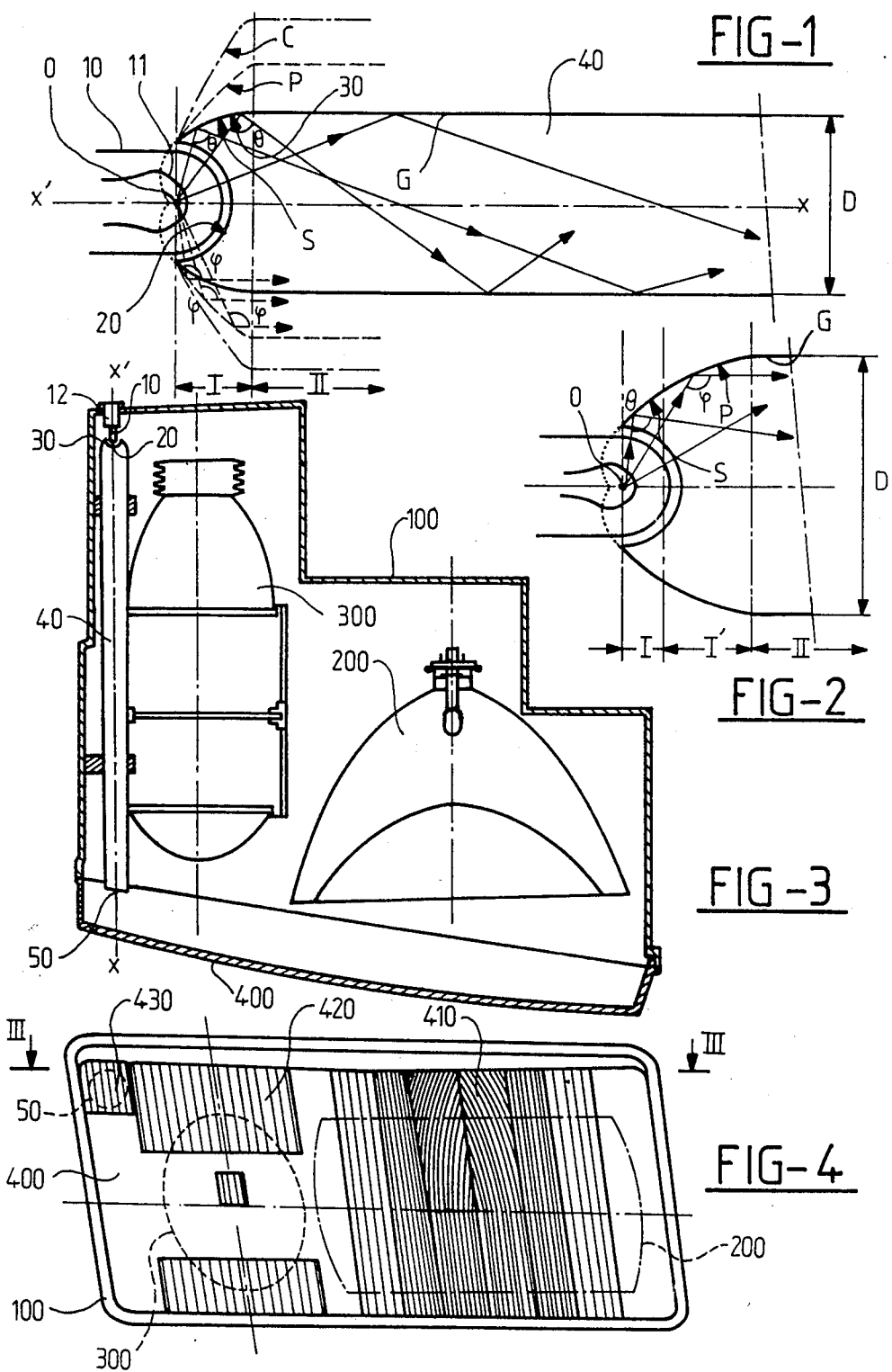

ADAPTOR FOR COUPLING A LIGHT GUIDE TO A LIGHT SOURCE, IN PARTICULAR FOR PROVIDING AN INTEGRATED SIDE LIGHT IN A MOTOR VEHICLE HEADLAMP ASSEMBLY

The present invention relates to an adaptor for a light guide and is suitable, in particular, for use in providing a side light which is integrated in a car headlamp assembly. The invention also relates to a headlamp assembly including such a side light.

BACKGROUND OF THE INVENTION

The term "light guide" is used to designate a homogenous bar of refractive material (e.g. glass or plastic material) which is elongate and generally cylindrical in shape. One of the ends of the bar the light guide receives light produced by an adjacent light source (this end is referred to as the "adaptor" or "coupling adaptor"), and light rays received by the adaptor are transmitted along the guide by multiple reflections at the interface between the refractive medium and air.

It can be shown, that for a cylindrical light guide, any ray of light which has been subjected to a first reflection on the inside of the cylindrical surface will necessarily strike said surface on subsequent occasions at an angle of incidence which is always greater than the minimum angle required for reflection. The ray will therefore continue to be reflected along the guide and is thus "trapped" therein until it reaches the other end, herein referred to as the "outlet end".

This condition remains substantially true even when the rod is slightly curved rather than being geometrically straight, thereby enabling light rays to be guided along a curvilinear path. However, the following description will be limited to the case of a straight cylindrical light guide (which in any case is true in the immediate vicinity of the coupling adaptor) even though the invention is equally applicable to curvilinear guides provided their radius of curvature remains large relative to their diameter.

The aim generally sought when designing a coupling adaptor is to capture a maximum light flux at the inlet to the guide. The property of "trapping" light rays only applies to rays which have entered the refracted medium and which have been subjected to a first reflection on the inside of the cylindrical surface of the guide; all other light rays emitted by the source are pure loss.

For a light guide, any ray striking the surface of the adaptor penetrates into the guide, and it may additionally be shown that if the surface of the adaptor is plane or convex, said ray will always be reflected by the inside cylindrical surface of the guide. Thus, in this case, any ray striking the surface of the adaptor is necessarily "trapped" inside the guide, regardless of its initial angle of incidence.

The light flux captured by the guide relative to the total flux emitted by the source is then determined by the solid angle centered on the source and intercepting the area of the adaptor (where the source is assumed to be a point source or a source which has been made equivalent to a point source).

In order to capture a maximum amount of light, it is therefore necessary either to bring the source close to the adaptor, or else to increase the area of the adaptor, with a consequent need to increase the diameter of the guide. The nearest the adaptor can be brought to the light source is determined by the size of the globe in which the light source is contained. The largest usable inlet area is limited by problems associated with excessive bar size, difficulties in curving the guide, and the quantity of material required to make the guide.

It is tempting to increase the amount of light flux which is captured by giving the adaptor surface a shape which is neither plane nor convex, but which is concave, thereby increasing the value of the above-specified solid angle and consequently increasing the proportion of light rays which penetrate into the guide.

However, when the surface of the adaptor is concave, it can be shown that some of the light rays emitted by the source and penetrating into the refractive medium subsequently pass through the cylindrical surface of the light guide since their angle of incidence on said surface is less than the limiting angle for total internal reflection in the refractive medium. These rays which leave the guide early are thus not collected, and as a result the light flux effectively conveyed by the light guide is generally less than it would have been if the adaptor surface were plane or convex.

It can thus be seen that the solution of hollowing out the adaptor to have a concave surface in which the light source is received is not, of itself, adequate to increase the light flux effectively conveyed by the light guide. Worse, it is observed that the quantity of light flux which is effectively conveyed by the light guide is less than the quantity which would have been conveyed using a plane or convex adaptor.

Preferred embodiments of the present invention provide a coupling adaptor for a light guide giving increased light flux capture.

SUMMARY OF THE INVENTION

The present invention provides a coupling adaptor for a cylindrical light guide, for coupling said guide with a substantially point light source located on the axis of the guide, said coupling adaptor comprising:

an inlet surface which is spherical and concave, which is centered on said point light source and which receives a portion thereof, whereby any light ray emitted by said source and striking said inlet surface passes through said inlet surface without deflection and penetrates inside the light guide; and a light flux recovery surface which is convex and symmetrical about the axis of said light guide, said recovery surface being shaped in such a manner that the angle of incidence of a ray emitted by the source, passing through said inlet surface and striking said recovery surface is always greater than the limiting angle for total internal reflection appropriate to the refractive index of the material constituting the light guide;

whereby any light ray which passes through the inlet surface is totally reflected by the recovery surface and is captured by the light guide.

For example, if the inlet surface is a hemispherical surface, all light rays emitted to one side of a plane passing through the source and perpendicular to the light guide axis are captured, which corresponds to an acceptance cone having a half-angle at the apex of 90°, which value is considerably greater than the values previously obtained.

(Light sources of very small physical size are treated as point source by assuming that all of the light-emitting points, e.g. all of the points on the filament of an incandescent lamp, are located at a single point source, e.g. at the calculated barycenter of said points).

Preferably, the light flux recovery surface is generated by a meridian which is at least partially formed by an arc of a logarithmic spiral centered on the source and having a characteristic angle greater than the limiting angle for total internal reflection. It can be shown that this particular profile for the recovery surface corresponds to a minimum diameter light guide, thereby enabling the guide to be very small and compatible with said theoretical optimum without losing flux.

In this case, the light flux recovery surface preferably runs smoothly into the cylindrical surface of the light guide such that the tangent to the logarithmic spiral is the same as a generator line of the cylindrical surface where the cylindrical surface and the light recovery surface meet. The surface is thus smoothly continuous without any singularity thereby facilitating manufacture, and in particular rod molding.

In a variant, the light flux recovery surface is generated by a meridian which is at least partially formed by an arc of a parabola having its focus located at the point source.

It is also possible to combine the above variants. In this case, the parabolic arc connects the logarithmic spiral arc to the generator line of the cylindrical surface, with the tangents to the logarithmic spiral and the parabola being the same where they meet.

This third configuration has the advantage of enabling the adaptor to be fitted to a given light guide diameter so long as the imposed guide diameter is greater than the theoretical minimum diameter corresponding to the logarithmic spiral profile used.

The invention also provides a headlamp assembly for a motor vehicle, said assembly including an integrated side light, and comprising:

a common housing at least one headlamp or dipped headlamp projector;

a light source for said side light disposed at a distance from the front portion of the assembly; and a light guide etending from a coupling adaptor as defined above to a light outlet end which is disposed at the front portion of the assembly.

Preferably, the light outlet end is located inside the projector assembly close to a transparent front closure member thereof. In this case, the region of the front closure member which receives the rays from the outlet end is advantageously provided with light-diffusing grooves or ridges.

This configuration for a headlamp assembly is particularly advantageous for very small assemblies, and in particular those which use a dipped headlamp projector which includes an elliptical reflector.

In this case, conventional solutions are difficult to apply: firstly because of the small size the bulb for the side light cannot occupy a portion of the reflector without significantly degrading the quality of the resulting beam (and this is particularly true of projectors having an elliptical reflector since these are very compact); and secondly, if the bulb for the side light is located just behind the transparent closure member, there are considerable problems of gaining access to the bulb when it needs replacing.

The invention solves these difficulties by enabling the bulb for the side light to be located at a distance from the front of the projector assembly (e.g. at the rear thereof) and thus making the bulb easily accessible.

This can only be achieved successfully when a light guide is used having a coupling adaptor in accordance with the invention since such an adaptor collects a very much greater quantity of light than the quantity of light which is collected by prior art adaptors.

Further, the considerable reduction in light guide diameter makes it considerably easier to install the light guide in the housing of the projector assembly, and also provides considerable savings in material used.

BRIEF DESCRIPTION OF THE DRAWING

Embodiments of the invention are described by way of example with reference to the accompanying drawing, in which:

FIG. 1 is a diagrammatic longitudinal section through a light guide including a coupling adaptor in accordance with the invention and coupled to a light source;

FIG. 2 is a longitudinal section similar to FIG. 1, but showing a variant profile for the recovery surface, said profile including two curves of different natures;

FIG. 3 is a plan view in section on a line III—III of FIG. 4 through a projector assembly including an integrated side light using a light guide terminated by an adaptor in accordance with the invention; and FIG. 4 is a front view of the FIG. 3 projector assembly, and shows the diffusing grooves and ridges formed in the front closure member.

MORE DETAILED DESCRIPTION

In FIG. 1, reference 10 designates the side lamp, which is of standardized design (size, supply voltage). It emits light from a filament 11 which is treated as though it constitutes a point source of light at a point 0, which point may be taken to be the barycenter of the various points constituting the filament 11.

The light source is placed on the axis $x'x$ of a light guide 40 which is in the form of a circular cylinder of diameter D and generated by a generator line G (the central portion of the light guide may be curved, but it is in the form of a right circular cylinder in the vicinity of the light source 10).

The cylindrical portion of the light guide, marked II, is terminated by an adaptor marked I, which adaptor comprises a concave inlet surface 20 and a convex light recovery surface 30.

The inlet surface 20 is substantially spherical, e.g. hemispherical, and is centered on 0, i.e. on the point of the light source. In this manner, any ray emitted from the source strikes the inlet surface at a zero angle of incidence (for a sphere, the normal to the surface and the radius vector are the same), thus ensuring that the light passes through the inlet surface without any deflection, and a fortiori without any reflection.

Those light rays which pass through the inlet surface at a small angle to the axis $x'x$ are subjected to their first reflection in the zone II, i.e. in the cylindrical zone of the light guide and remain trapped therein.

However, lines which are at a large angle to the axis $x'x$ are subjected to their first reflection on the recovery surface 30. In order to ensure that the rays are indeed reflected and do not pass through the recovery surface, the recovery surface is shaped such that the angle of incidence $\theta/2$ is always greater than the limiting angle for total internal reflection corresponding to the refractive index of the material constituting the light guide.

In particular, it is shown that the theoretical optimum is achieved when the recovery surface 30 has a profile in the form of a logarithmic spiral S (this profile is shown in solid lines and the virtual or missing portions thereof are shown in dotted lines) centered on the source and having a characteristic angle which is slightly greater than the limiting angle for total internal reflection. One of the geometrical properties of a logarithmic spiral is to form a constant angle between the radius vector and the normal to the curve (and this angle is the angle referred to as the "characteristic angle"). In optical terms, this angle is the angle of incidence of the light ray, such that all rays which pass through the inlet surface are totally internally reflected on the recovery surface and are subsequently trapped by the light guide.

Other forms of recovery surface are possible, even though they require the light guide to have a larger diameter than the diameter D for given captured light flux. In particular, on FIG. 1 a dashed line shows a recovery surface generated by an arc of a parabola P. The angle of incidence $\phi/2$ is then variable, and any rays striking the recovery surface is reflected parallel to the direction x'x.

Similarly, a dot-dashed line shows a recovery surface constituted by a cone C. This shape of recovery surface gives rise to a light guide of even larger diameter than the two previous solutions, for constant captured light flux.

FIG. 2 shows a variant in which the profile of the recovery surface comprises an arc of a logarithmic spiral S (region I) which is extended by an arc of a parabola P (region I'). As before the logarythmic spiral is centered at the point 0, and the focus of the parabola is the same point 0. Preferably, where the spiral arc and the parabola arc meet, their tangents are the same so as to obtain a recovery surface which is smoothly continuous. However, it is not possible to ensure smooth continuity between the arc of the parabola P and the generator line G of the cylinder, unlike the version which includes only a logarithmic spiral, in which such continuity between the recovery surface and the cylindrical surface is, indeed, possible (as shown in FIG. 1).

FIG. 3 shows a headlamp assembly for a motor vehicle constituting an application of the adaptor in accordance with the invention. The headlamp assembly comprises a single housing 100 enclosing a main beam projector 200 (for example of the conventional parabolic type), and a dipped beam projector 300 (for example of the elliptical type). The front of the assembly is closed by a transparent closure member 400 (see front view of FIG. 4) having diffusion grooves and ridges molded or engraved thereon in order to improve the sideways spread of the projected light beams.

This assembly includes a side light which is integral therewith and which comprises a standardized bulb 10 at the rear of the housing mounted in a cylinder 12 to enable the bulb to be removed and replaced from the rear. Said cylinder includes the necessary electrical leads. As a general rule, the rear face of the housing is the only face which is easily accessible when the headlamp assembly is mounted in a vehicle. The bulb 10 is mounted on the axis x'x of a light guide 40 whose rear end constitutes the coupling adaptor including an inlet surface 20 and a light flux recovery surface 30 of the type described above. The other end of the light guide is constituted by a an outlet end 50 which is located inside the housing close to the front closure member 400.

In addition to diffusion grooves or ridges 410 and 420 on said closure member for diffusing the rays emitted by the main and dipped beams 200 and 300, similar grooves and ridges 430 are provided in the region receiving light rays from the outlet end 50.

As already mentioned above, only the coupling adaptor in accordance with the invention enables an adequate amount of light flux to be captured for use as a side light when a standardized type of side light bulb is used at the rear end of the light guide.

In addition, the small diameter of the light guide (about 20 to 25 mm in the application described) makes it possible for the guide to be received without difficulty even in the most compact headlamp assemblies.

The intended application of the coupling adaptor to a headlamp assembly is not limiting in any way, and coupling adaptors in accordance with the invention may be used in numerous other technical fields which require light guides.

In particular, the adaptor is applicable to light guides of very small diameter, such as optical fibers used in telecommunications applications or in signal transmission applications (in which cases the light sources are generally light-emitting diodes which emit in the visible or infrared regions of the spectrum).

The invention is not limited to rectilinear guides either, but is also applicable to curvilinear light guides. In this respect, it should be observed that the smaller the diameter of the light guide the easier it is to curve it. Use of the present invention enables a minimum diameter guide to be obtained for given captured light flux.

I claim:

1. A coupling adaptor for a cylindrical light guide, for coupling said guide with a substantially point light source located on the axis of and integral with the guide, said coupling adaptor being solid and homogeneous and comprising:
    an inlet surface which is spherical and concave, which is centered on said point light source and which receives a portion thereof, whereby any light ray emitted by said source and striking said inlet surface passes through said inlet surface without deflection and penetrates inside the light guide; and
    a light flux recovery surface which is convex and symmetrical about the axis of said light guide, said recovery surface being shaped in such a manner that the angle of incidence of a ray emitted by the source, passing through said inlet surface and striking said recovery surface is always greater than the limiting angle for total internal reflection appropriate to the refractive index of the material constituting the light guide;
    whereby any light ray which passes through the inlet surface is totally reflected by the recovery surface and is captured by the light guide.

2. An adaptor according to claim 1, wherein the light recovery surface is generated by a meridian which is at least partially constituted by an arc of a logarithmic spiral centered on the light source and having a characteristic angle which is greater than the limiting angle for total internal reflection.

3. An adaptor according to claim 2, wherein the tangent to the logarithmic spiral and the generator line of the cylindrical light guide are the same where the light flux recovery surface meets the cylindrical surface of the light guide.

4. An adaptor according to claim 1, wherein the light flux recovery surface is generated by a meridian which is at least partially constituted by an arc of a parabola whose focus is located at the light source.

5. An adaptor according to claim 1, wherein the light flux recovery surface is generated by a meridian which is formed in part by an arc of a logarithmic spiral centered on the source and having a characteristic angle greater than the limiting angle for total internal reflection, and in part by an arc of a parabola having its focus at the source, the arc of the parabola connecting the arc of the logarithmic spiral to the cylindrical surface of the light guide and the tangents of the logarithmic spiral and the parabola being the same where said portions meet.

6. An adaptor according to claim 1, wherein the inlet surface is a substantially hemispherical surface.

7. A headlamp assembly for a motor vehicle, said assembly including an integrated side light, and comprising:
- a common housing
- at least one headlamp or dipped headlamp projector;
- a substantially point light source for said side light disposed at a rear portion of the housing; and
- a light guide extending from the light source at the rear portion of the housing to a light outlet end which is disposed at the front portion of the assembly,
- a coupling adaptor for the light guide,
- said coupling adaptor comprising an inlet surface which is spherical and concave, which is centered on said point light source and which receives a portion of the light therefrom, whereby any light ray emitted by said source and striking said inlet surface passes through said inlet surface without deflection and penetrates inside the light guide; and
- a light flux recovery surface which is convex and symmetrical about the axis of said light guide, said recovery surface being shaped in such a manner that the angle of incidence of a ray emitted by the source, passing through said inlet surface and striking said recovery surface is always greater than the limiting angle for total internal reflection appropriate to the refractive index of the material constituting the light guide;

whereby any light ray which passes through the inlet surface is totally reflected by the recovery surface and is captured by the light guide.

8. An assembly according to claim 7, wherein the outlet end of the light guide is located inside the headlamp assembly close to a transparent front closure member thereof.

9. An assembly according to claim 8, wherein the region of said transparent front closure member which receives light rays from the outlet end of the light guide is provided with grooves and ridges for diffusing light.

* * * * *